(12) United States Patent
Kawasaki

(10) Patent No.: US 8,891,134 B2
(45) Date of Patent: Nov. 18, 2014

(54) IMAGE FORMING APPARATUS

(71) Applicant: Kyocera Document Solutions Inc., Osaka (JP)

(72) Inventor: Tomohiro Kawasaki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/192,170

(22) Filed: Feb. 27, 2014

(65) Prior Publication Data

US 2014/0177005 A1 Jun. 26, 2014

Related U.S. Application Data

(62) Division of application No. 12/405,785, filed on Mar. 17, 2009, now abandoned.

(30) Foreign Application Priority Data

Jun. 13, 2008 (JP) ................. 2008-155918
Jun. 13, 2008 (JP) ................. 2008-155919

(51) Int. Cl.
*H04N 1/407* (2006.01)
*G06K 15/02* (2006.01)
*H04N 1/60* (2006.01)

(52) U.S. Cl.
CPC .......... *G06K 15/1878* (2013.01); *H04N 1/6022* (2013.01); *H04N 1/6072* (2013.01)
USPC ......... 358/3.26; 358/3.27; 358/3.28; 358/1.9; 358/540; 358/450

(58) Field of Classification Search
CPC ............ H04N 1/00037; H04N 1/0005; H04N 1/00082; H04N 2201/3271; H04N 1/32208; H04N 1/00005; H04N 1/32149
See application file for complete search history.

(56) References Cited

U.S. PATENT DOCUMENTS

| | | | |
|---|---|---|---|
| 6,348,977 B1 | 2/2002 | Ooki | |
| 6,999,101 B1 * | 2/2006 | Sanborn et al. | 345/619 |
| 8,160,397 B1 * | 4/2012 | Wu | 382/294 |
| 8,459,799 B2 * | 6/2013 | Wakabayashi et al. | 353/36 |
| 8,493,629 B2 * | 7/2013 | Oi | 358/3.28 |
| 8,538,192 B2 * | 9/2013 | Habuka et al. | 382/274 |
| 8,660,357 B2 * | 2/2014 | Oi | 382/182 |
| 2007/0285525 A1 | 12/2007 | Okuyama | |

FOREIGN PATENT DOCUMENTS

| | | |
|---|---|---|
| JP | 05-083540 | 4/1993 |
| JP | 07-256972 | 10/1995 |
| JP | 11-238119 | 8/1999 |

(Continued)

*Primary Examiner* — Dung Tran
(74) *Attorney, Agent, or Firm* — K&L Gates LLP

(57) ABSTRACT

An image forming apparatus includes a reading unit that reads image data, a drawing data storage unit that stores object data comprising the read image data so as to allow the stored object data to be distinguished between a vector object and a raster object, a vector gray determination unit that determines whether each of stored vector objects is formed of an achromatic color, a raster gray determination unit that determines whether each of stored raster objects is formed of an achromatic color, and an output data creation unit that converts the stored object data into multicolor when when the stored object data includes a chromatic color and converts the stored object data into monochrome when the stored object data is formed only of achromatic colors.

9 Claims, 19 Drawing Sheets

(56) References Cited

FOREIGN PATENT DOCUMENTS

| | | |
|---|---|---|
| JP | 2000-052601 | 2/2000 |
| JP | 2005-128064 | 5/2005 |
| JP | 2006-155221 | 6/2006 |
| JP | 2007-336542 | 12/2007 |

* cited by examiner

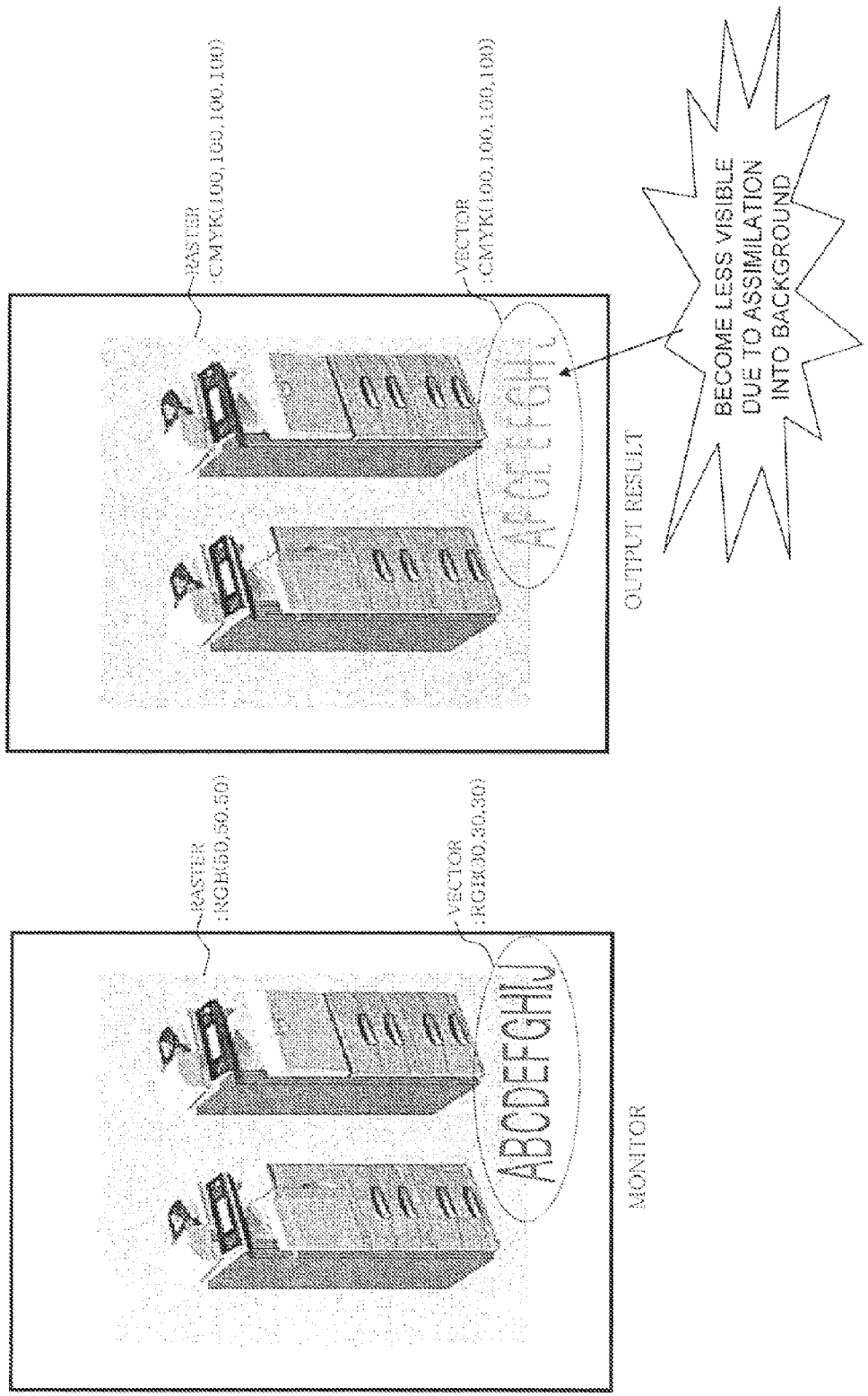

IMAGE FORMING APPARATUS

INCORPORATION BY REFERENCE

This application is divisional application of U.S. Ser. No. 12/405,785, filed Mar. 17, 2009, which is based upon and claims the benefit of priority from the corresponding Japanese Patent Application No. 2008-155918, filed Jun. 13, 2008, and Japanese Patent Application No. 2008-155919, filed Jun. 13, 2008, the entire contents of which is incorporated herein by reference.

BACKGROUND

1. Field of the Invention

The present invention relates to an image forming apparatus for effectively performing an image processing on image data in which a vector object and a raster object coexist.

2. Description of the Related Art

Up to now, when outputting an achromatic-color (gray) image using a color printer, it is typically possible to express an achromatic color by mixing several colors using a predetermined color conversion table.

According to the principle of subtractive color mixing, the achromatic color can be expressed by performing printing with the three primary colors, yellow (Y), magenta (M), and cyan (C), being mixed in equal proportions.

However, the thus-expressed achromatic color is not as sharp as an achromatic color produced using a single color of black (K), and can produce an unusual resultant product such as a color drift.

To solve the above-mentioned problem, an image forming apparatus is provided with a line-drawing extraction circuit wherein when dots that compose a black character or a black line drawing are extracted from composited image data obtained by compositing color image data and binary black and white image data, bits corresponding to the extracted dots within a bitmap memory are set to "1". The image forming apparatus is configured so that when a bit corresponding to a dot of a color signal within the bitmap memory is "1", the color signal is output with CMY and K converted to 0 and a maximum value, respectively, and printing thereof is performed with only K ink.

Accordingly, the image forming apparatus is configured so that when a part of the data related to black is detected from the subject image data, that part is expressed in a single color of black (K), thereby attempting to prevent color drift or the like from occurring in the outputted image. When the printing of an achromatic color including not only black, but also gray is similarly performed using only the K ink, the same result can be obtained.

However, the image forming apparatus described above does not distinguish between a raster object (for example, a scan image) and a vector object (for example, a character) in the subject image data.

For example, in the image forming apparatus, when the image data includes a vector object, the vector object is not composed of dots. Therefore, even when the vector object is drawn in the achromatic color, the image forming apparatus still expresses the vector object in multicolor (for example, CMY or CMYK).

Accordingly, in the image forming apparatus, a color processing is still required even to reproduce the vector object in the achromatic color.

Therefore, in a situation such as illustrated in FIG. 10, where two objects whose areas overlap each other are both black and where one of the objects is composed of a vector object and the other a raster object, output formats are a CMYK output and a K output, respectively, and hence there is a blur in the overlapping area, resulting in reduced visibility.

Another image forming apparatus expresses a raster object and a vector object in CMY or CMYK. In this situation, mutually different color conversion tables are generally used to perform color conversion. This is due to the fact that the raster object is image data for reproducing colors as closely as possible to that which a human sees, while the vector object is designed to express characters and lines more sharply.

In FIG. 18 an example of a raster color table and a vector color table are illustrated that are included in a conventional image forming apparatus. As illustrated in FIG. 18, even when an RGB input value of "(50, 50, 50)" for the raster object and an RGB input value of "(30, 30, 30)" for the vector object are different from each other, both produce the same CMYK output value of "(100, 100, 100, 100)". As a result, the vector object and the raster object assimilate each other, thereby making the output image not as sharp.

Specifically, in the situation illustrated in FIG. 19, where image data is obtained by using a watermark (electronic watermark) that reads "ABCDEFGHIJ" and a scan image with an overlap, it is possible to clearly distinguish an overlapping portion that corresponds to the overlap on a monitor (see the left half of FIG. 19). However, in the actual outputted image a part of the watermark is assimilated into the scan image and has reduced visibility (see the right half of FIG. 19).

SUMMARY

The present invention provides an image forming apparatus capable of recognizing an object and able to process image data in which a vector object and a raster object coexist while producing an image without non-sharp areas.

An image forming apparatus according to an embodiment of the present invention comprises a reading unit, a drawing data storage unit, a vector gray determination unit, a raster gray determination unit, and an output data creation unit. The reading unit reads image data. The drawing data storage unit stores object data comprising the read image data so as to allow the stored object data to be distinguished between a vector object and a raster object. The vector gray determination unit determines whether or not each of stored vector objects is formed of an achromatic color. The raster gray determination unit determines whether or not each of stored raster objects is formed of an achromatic color. The output data creation unit converts the stored object data into multi-color when the stored object data includes a chromatic color, and converts the stored object data into monochrome when the stored object data is formed only of achromatic colors.

In another embodiment of the present invention, an image forming apparatus is provided that comprises a data reading unit, a band split unit, an overlap band detection unit, a specified color value acquisition unit, an overlap band representative color detection unit, an output color value calculation unit, and a visibility determination unit. The data reading unit reads image data. The band split unit divides the read image data into a plurality of bands allowing each of object data comprising the image data to be distinguished between a vector object and a raster object. The overlap band detection unit identifies a band having an overlap between the vector object and the raster object. The specified color value acquisition unit determines a color value of a vector object existing in the overlap band. The overlap band representative color detection unit determines a representative color of a raster object existing in the overlap band. The output color value calculation unit calculates an output color value corresponding to the color value of the vector object and an output color value corresponding to the representative color of the raster object. The visibility determination unit determines a visibility of an overlapping portion based on a comparison of output color values.

Additional features and advantages are described herein, and will be apparent from the following Detailed Description and the figures.

BRIEF DESCRIPTION OF THE FIGURES

In the accompanying drawings:

FIG. 19 is a diagram illustrating a malfunction caused in an output image by the image forming apparatus illustrated in FIG. 8.

DETAILED DESCRIPTION

Hereinafter, description is made of embodiments of the present invention.

Figure 1:
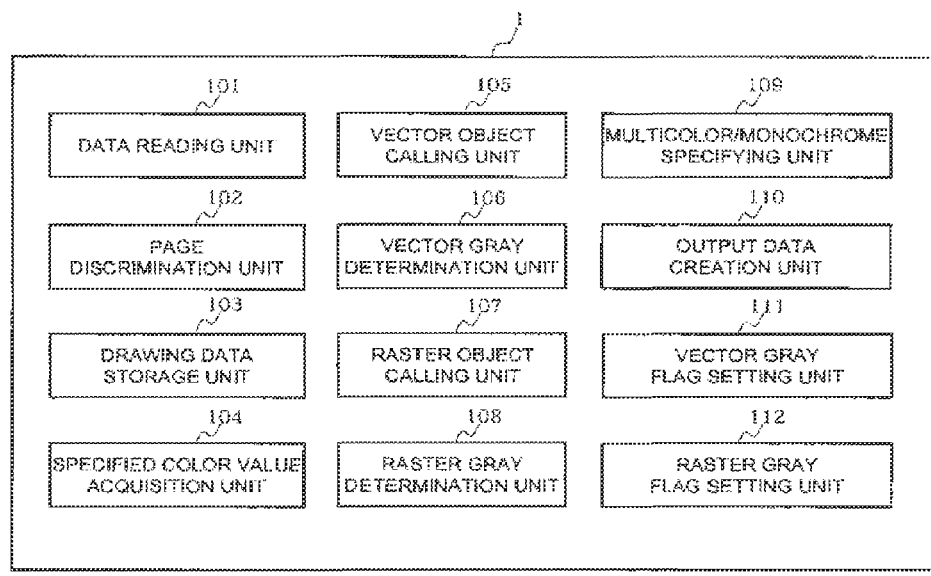
FIG. 1 is a functional block diagram illustrating a configuration of an image forming apparatus according to an embodiment of the present invention.

FIG. 1 is a functional block diagram illustrating a configuration of an image forming apparatus according to an embodiment of the present invention.

An image forming apparatus 1 according to this embodiment comprises units as illustrated in FIG. 1. The image forming apparatus 1 performs the functions of the units by executing a program. The program represents a computer program for implementing the units by being executed by a computer (not shown) of the image forming apparatus 1. The computer includes a central processing unit (CPU), a read only memory (ROM), a random access memory (RAM), and an interface. The CPU is a processor for executing processings described in a program. The ROM is a nonvolatile memory for prestoring a program and data. The RAM is a memory for temporarily storing the program and the data when the program is being performed.

A data reading unit 101 reads "page description language (PDL)" data transmitted from a host computer (not shown) or the like.

Examples of the typical page description language include PCL-XL, PostScript, HP-PCL, LIPS, ESC/Page, and PRESCRIBE.

A page discrimination unit 102 analyzes the PDL data, and recognizes the start and the end of a page of the subject image data. A vector gray analysis and a raster gray analysis, which are described hereinafter, are performed on each page, and therefore require such a page discrimination in advance.

A drawing data storage unit 103 appends a distinguishing label of "vector" or "raster" to drawing data received after the start of the page. The drawing data storage unit 103 stores color values thereof in a memory or other storage device (see FIG. 5).

A specified color value acquisition unit 104 extracts a necessary color value from a color registration table such as a pallet or an index table when a color value is not directly specified for a subject object.

A vector object calling unit 105 extracts the vector object when the end of the page is recognized. The vector object calling unit 105 searches the memory or the like to extract therefrom object data to which the distinguishing label of "vector" is appended.

A vector gray determination unit 106 determines whether or not the object data extracted by the vector object calling unit 105 is gray (achromatic color, including black).

When the vector gray determination unit 106 confirms that all of vector objects included in the subject 1-page image data are gray, a vector gray flag setting unit 111 sets the vector gray flag as "ON" in the memory. On the other hand, when there is a vector object including a chromatic color, the vector gray flag setting unit 111 sets the vector gray flag as "OFF" in the memory.

A raster object calling unit 107 extracts the raster object when the end of the page is recognized. The raster object calling unit 107 searches the memory or the like to extract therefrom object data to which the distinguishing label of "raster" is appended.

A raster gray determination unit 108 analyzes whether or not the object data extracted by the raster object calling unit 107 is gray (achromatic color, including black).

When the raster gray determination unit 108 confirms that all of raster objects included in the subject 1-page image data are gray, a raster gray flag setting unit 112 sets the raster gray flag as "ON" in the memory. On the other hand, when there is a raster object including a chromatic color, the raster gray flag setting unit 112 sets the raster gray flag as "OFF" in the memory.

A multicolor/monochrome specifying unit 109 references the vector gray flag and the raster gray flag to determine whether or not multicolor image conversion processing using a multicolor table or a monochrome image processing is to be performed and to specify which is to be used.

An output data creation unit 110 performs a multicolor image output or a monochrome image output. When the multicolor/monochrome specifying unit 109 specifies multicolor, the output data creation unit 110 performs a CMYK output using the multicolor table. When monochrome is specified, performs a K (black) output using a gray processing.

Figure 2:
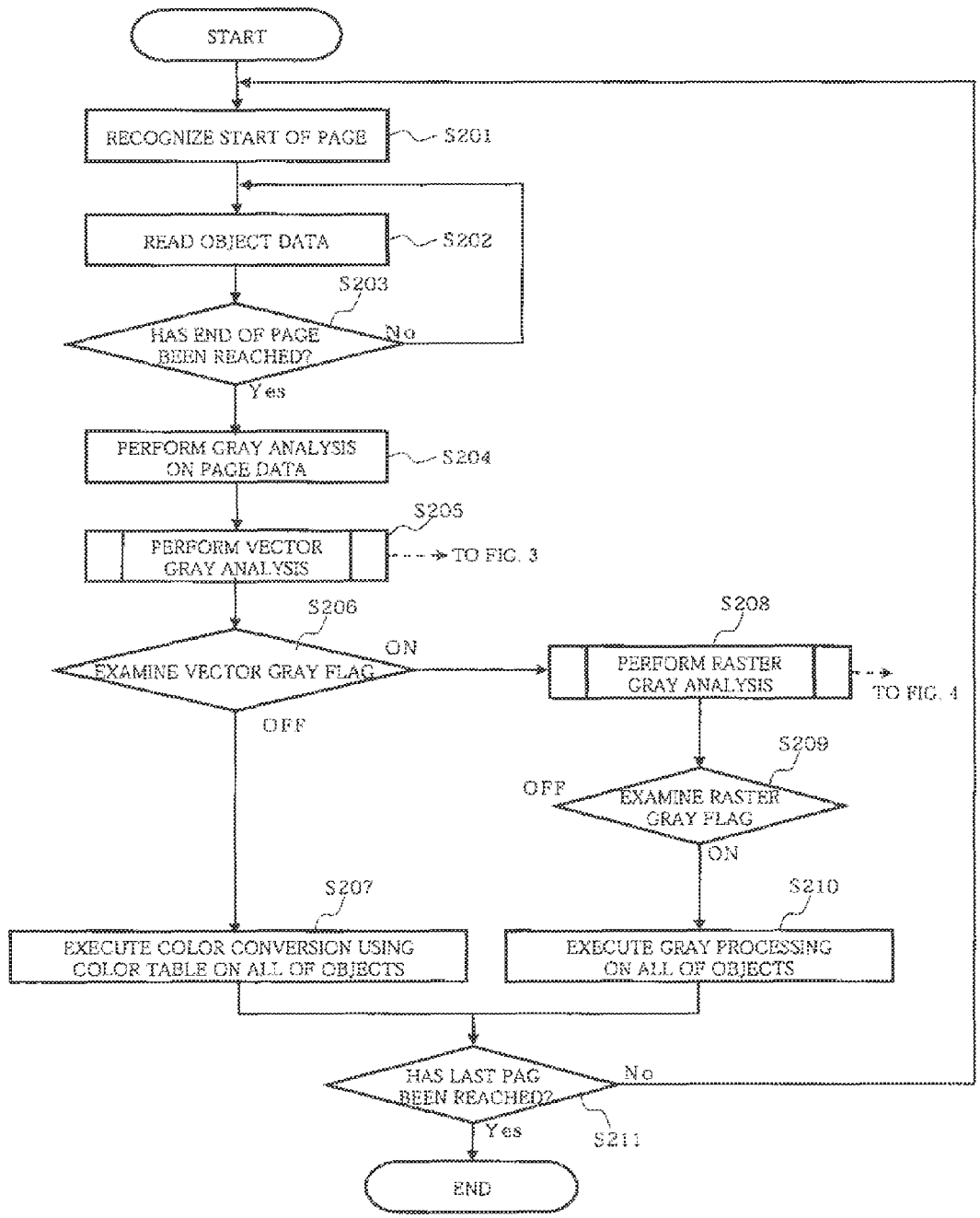
FIG. 2 is a flowchart illustrating an operation procedure related to a color conversion output performed by an image forming apparatus according to an embodiment of the present invention.
Figure 3:
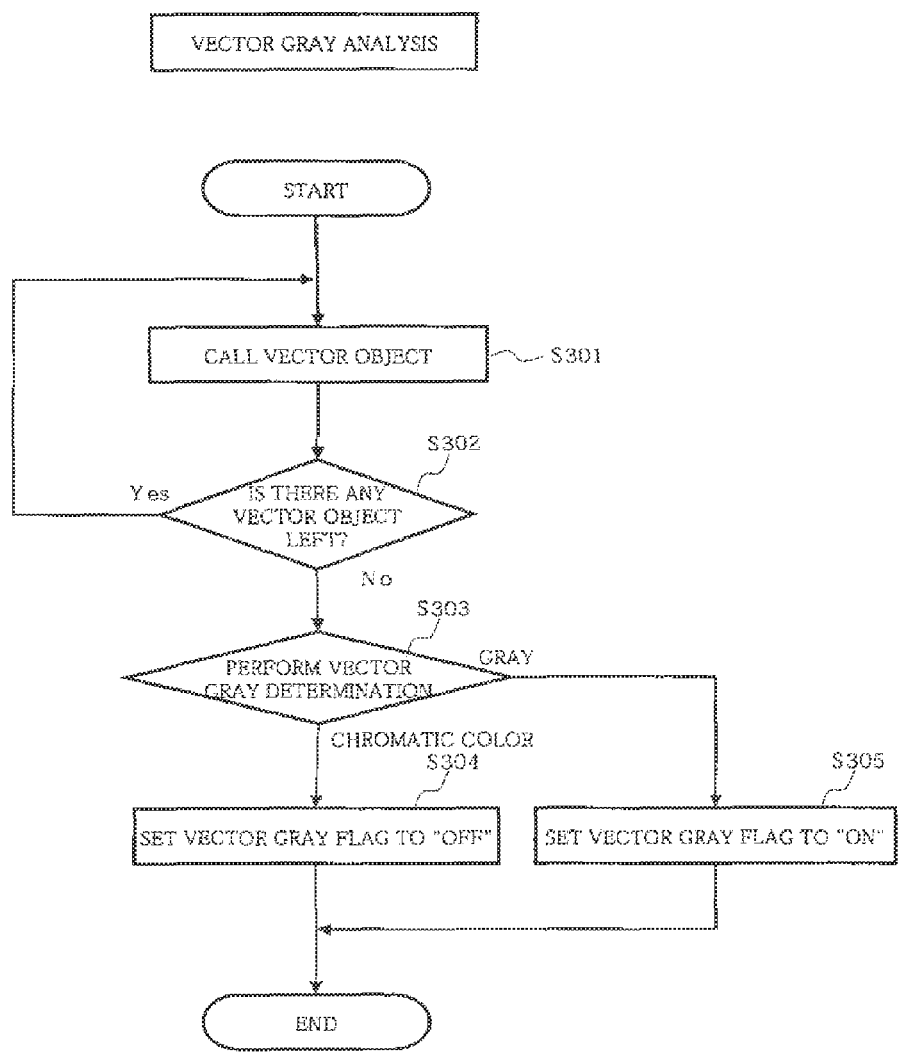
FIG. 3 is a flowchart illustrating a procedure for a vector gray analysis performed by the image forming apparatus according to the embodiment of FIG. 2 of the present invention.
Figure 4:
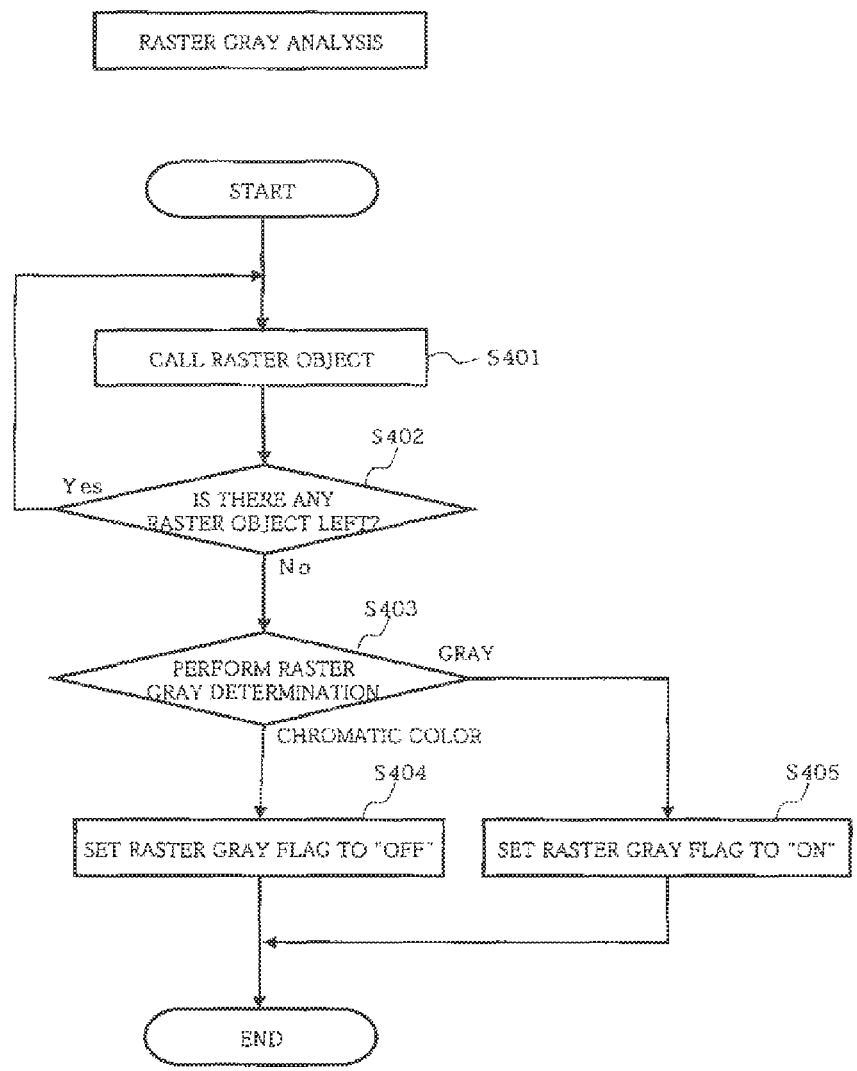
FIG. 4 is a flowchart illustrating a procedure for a raster gray analysis performed by the image forming apparatus according to the embodiment of FIG. 2 of the present invention.

FIGS. 2 to 4 describe the color conversion output process performed by the image forming apparatus 1 according to the embodiment having the configuration described above.

FIG. 2 is a flowchart illustrating the color conversion output procedure performed by the image forming apparatus according to this embodiment.

Note that as described hereinafter, an image processing is performed by determining a color conversion method on a page by page basis, and therefore a description is made hereinbelow of Pages 1 to 4 illustrated in FIGS. 6 to 9, respectively, in order.

Figure 6:
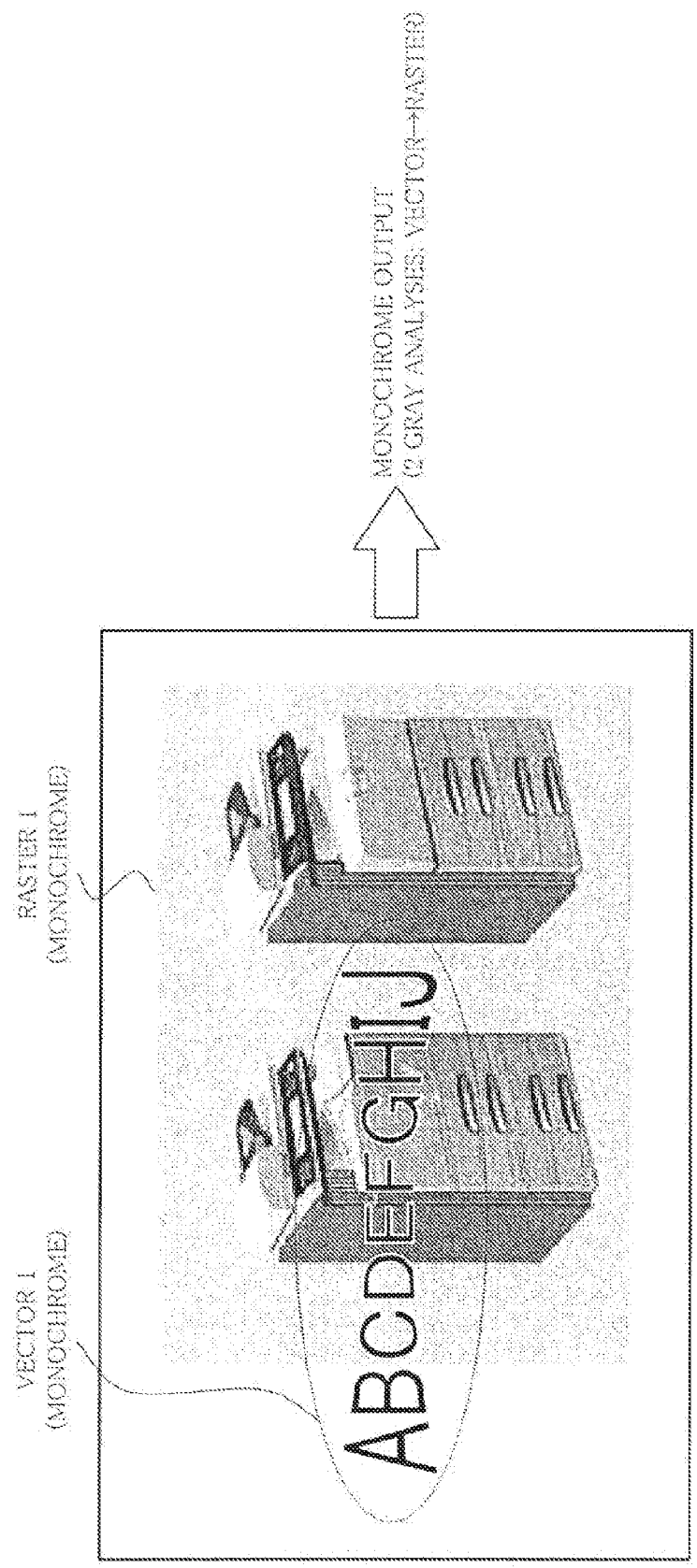
FIG. 6 illustrates an example of image data subjected to a color conversion process by the image forming apparatus according to the embodiment of FIG. 2 of the present invention.

As illustrated in FIG. 2, first, the data reading unit 101, of the image forming apparatus 1, reads the PDL data on Page 1 (illustrated in FIG. 6). Then, the page discrimination unit 102 determines the start of the page (S201).

The drawing data storage unit 103 then reads all of the object data included in Page 1. The object data is stored in the memory (S202).

Specifically, the characters "ABCDEFGHIJ" illustrated in FIG. 6 are read as vector data. A label of "Vector 1", for distinguishing the vector data and a color value of "(R, G, B)=(128, 128, 128)", which indicates a black color, are stored in the memory in association with each other.

The color value used for the vector data may be the object data itself, or may be a specified color value extracted by the specified color value acquisition unit 104 from the palette wherein color values are registered in advance.

The drawing data storage unit 103 then reads the photograph data (photograph image of a copier constituted of a bitmap) illustrated in FIG. 6 as raster data. A label of "Raster 1" for distinguishing the raster data and a color value is stored in the memory.

The color value used for the raster object is an RGB value extracted by the specified color value acquisition unit 104, from a predetermined index table when the object data does not have an index image that itself comprises color values.

Figure 5:
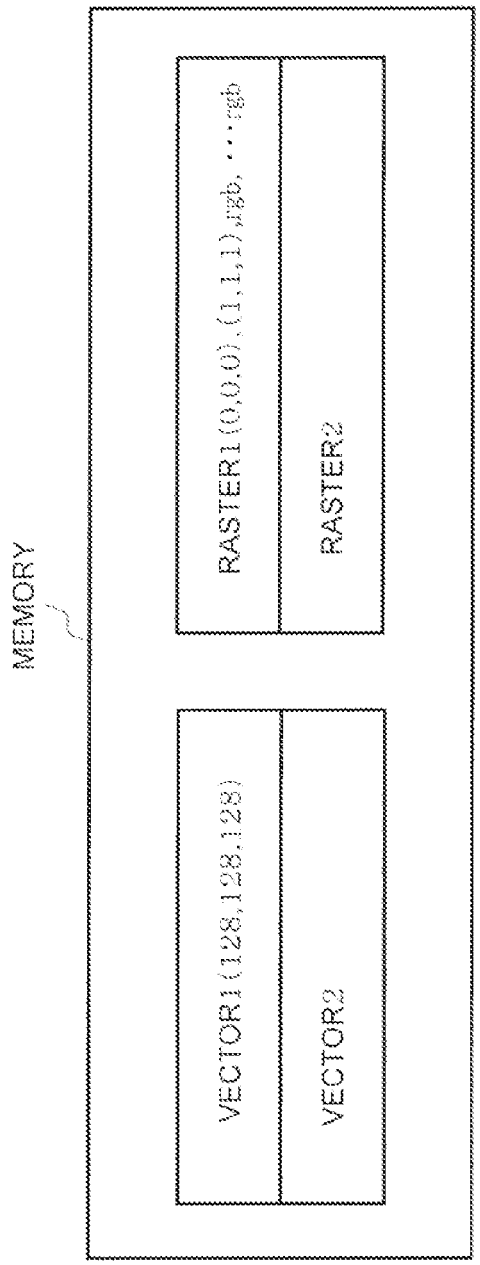
FIG. 5 schematically illustrates the vector objects and raster objects stored in a memory of the image forming apparatus according to the embodiment of FIG. 2 of the present invention.

As a result, as illustrated in FIG. 5, the data related to the vector object and the raster object are stored in the memory.

Note that the reading of the object data is continuously performed (S203: NO) until all of the object data on the page (that is, Page 1) has been read.

Then, when all of the object data included in Page 1 has been read (S203: YES), a gray analysis is performed on the object data on Page 1 (S204). In the gray analysis, the vector gray analysis is first performed (S205).

Referring now to FIG. 3, a description is made of the vector gray analysis.

FIG. 3 is a flowchart illustrating a procedure for the vector gray analysis performed by the image forming apparatus according to an embodiment.

In the vector gray analysis, first, the vector object calling unit 105 extracts data related to the vector object from the data stored in the memory (S301).

In the case of Page 1, the data on Vector 1 is first extracted.

The extraction of the vector object is performed on all of the vector objects (when there are N vector objects, Vectors 1 to N) on the page (S302: YES).

When the vector object calling unit 105 has extracted all of the vector objects (S302: NO), the vector gray determination unit 106 performs a vector gray determination on each of the vector objects (S303). Specifically, the vector gray determination unit 106 performs a vector gray determination based on whether or not all of the vector objects are gray according to the following criterion.

When the RGB value of the vector object satisfies "R=G=B", the determination results in "gray", or otherwise "chromatic color".

As a result of Step S303, when the vector gray determination unit 106 determines that all of the vector objects are gray (S303: gray), the vector gray flag setting unit 111 sets the vector gray flag to "ON", and the vector gray flag being "ON" is stored in the memory (S305).

In Step S303, even if only one vector object that is not gray is detected, by the vector gray determination unit 106, from all of the vector objects (S303: chromatic color), the vector gray flag setting unit 111 sets the vector gray flag to "OFF", and this setting is stored in the memory (S304).

In the example of Page 1, there is only one vector object, that is, Vector 1, which is gray, and hence the vector gray flag setting unit 111 sets the vector gray flag to "ON".

After the above-mentioned steps, the vector gray analysis ends.

As illustrated in FIG. 2, following the above-mentioned vector gray analysis, the multicolor/monochrome specifying unit 109 determines whether the vector gray flag is "ON" or "OFF" (S206).

In Step S206, when the vector gray flag is "OFF" (S206: OFF), the multicolor/monochrome specifying unit 109 causes the procedure to advance to Step S207. Alternatively, when the vector gray flag is "ON" (S206: ON), the multicolor/monochrome specifying unit 109 causes the procedure to advance to Step S208. In Step S208, the raster gray analysis is performed (S208).

Referring now to FIG. 4, a description is made of the raster gray analysis.

FIG. 4 is a flowchart illustrating a procedure for the raster gray analysis performed by the image forming apparatus according to an embodiment.

In the raster gray analysis, first, the raster object calling unit 107 extracts the raster object from the data stored in the memory (S401). In the case of Page 1, the data on Raster 1 is extracted.

Note that, the extraction of the raster object is performed on all of the raster objects (when there are N raster objects, Rasters 1 to N) on the page (S402: YES).

When the raster object calling unit 107 has extracted all of the raster objects (S402: NO), the raster gray determination unit 108 performs a raster gray determination on each of the raster objects (S403). Specifically, the raster gray determination unit 108 determines whether or not each of the raster objects is gray according to the following criterion.

When the pixels that comprise the raster object are only gray, the determination results in "gray". When the raster object includes a chromatic color, the result is "chromatic color".

The determination may use a method of determining "gray" when the difference calculated between color values comprising the pixels is within a predetermined range. The accuracy of the gray determination may be improved by applying edge emphasis, removing white noise, or performing other such processing.

In Step S403, when the raster gray determination unit 108 determines that all of the raster objects are gray (S403: gray), the raster gray flag setting unit 112 sets the raster gray flag to "ON". Thereafter, the raster gray flag as being "ON" is stored in the memory (S405).

In Step S403, even if only one non-gray raster object is detected, by the raster gray determination unit 108, from all of the raster objects (S403: chromatic color), the raster gray flag setting unit 112 sets the raster gray flag to "OFF". Thereafter, the raster gray flag being "OFF" is stored in the memory (S404).

Applying the procedure to the Page 1 example, there is only one raster object, that is, Raster 1, which is gray, and hence the raster gray flag setting unit 112 sets the raster gray flag to "ON".

After the above-mentioned steps, the raster gray analysis ends.

Following the above-mentioned raster gray analysis, the multicolor/monochrome specifying unit 109 determines whether the raster gray flag is "ON" or "OFF" (S209).

In Step S209, when the raster gray flag is "OFF" (S206: OFF), the multicolor/monochrome specifying unit 109 causes the procedure to advance to Step S207. Alternatively, when the raster gray flag is "ON" (S209: ON), the multicolor/monochrome specifying unit 109 causes the procedure to advance to Step S210.

In the example of Page 1, the vector gray flag and the raster gray flag are both set to "ON", and hence the multicolor/monochrome specifying unit 109 causes the procedure to advance to Step S210.

In Step S207, the output data creation unit 110 performs an image output by subjecting all of the objects to a color conversion using the multicolor table.

Meanwhile, in Step S210, the output data creation unit 110 performs an image output by subjecting all of the objects to a gray processing. Specific examples of the gray processing that may be used include: a method of creating output data of a gray value by an NTSC-system weighted average method; and a method of obtaining a gray value by, for example, obtaining a Y value after conversion into XYZ by a matrix calculation and using a one-dimensional table for Y→K to perform an inverse calculation.

After either Step S207 or S210 is completed, the procedure advances to an image processing on the next page (Page 2). The same procedure is then followed processing the pages until the last page (Page 4) is reached (S211).

Figure 7:
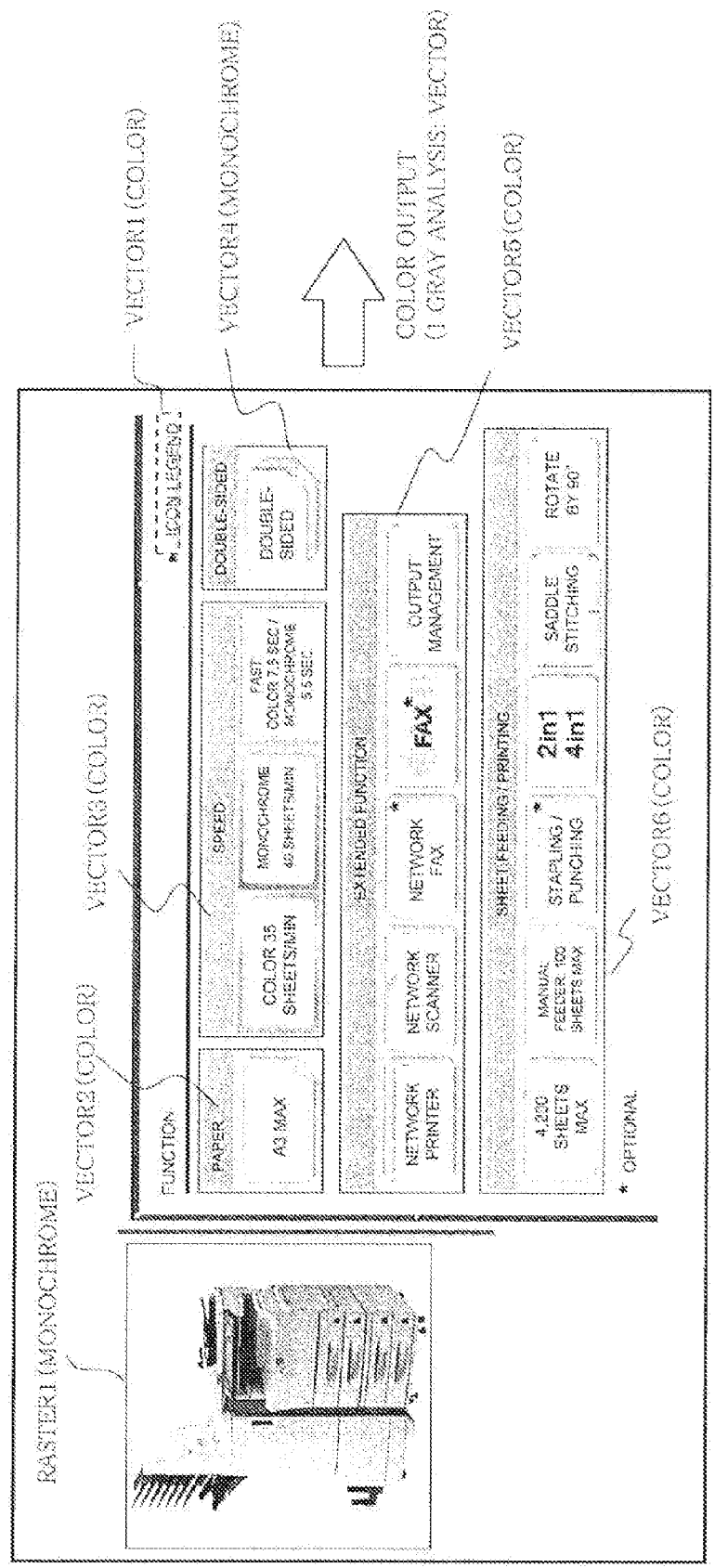
FIG. 7 illustrates an example of the image data subjected to the color conversion process by the image forming apparatus according to the embodiment of FIG. 2 of the present invention.

As illustrated in FIG. 7, Page 2 is an example of image data in which vector objects (characters) including a chromatic color, a vector object (characters) formed only of gray, and a raster object (photograph) formed only of gray coexist.

The procedure for the image processing for this situation is described with reference to the flowchart of FIG. 2.

First, in the same manner as the above-described situation for Page 1, all of the object data included in Page 2 are read (S201 to S203).

Using these steps, Raster 1 (monochrome) and Vectors 1 to 6 are extracted and the drawing data storage unit 103 stores data on each object in the memory. Note that Vector 1, that is, the characters that read "icon legend" are blue, and have a color value of "RGB (0, 0, 255)".

The gray analysis is then performed on Page 2 (S204).

In the same manner as in the previous situation, first the vector gray analysis (S205) is performed, details of which are illustrated in FIG. 3.

Herein, Step S303 is of importance. The determination for the flag differs depending on whether or not all of the objects are gray.

Of Vectors 1 to 6 on Page 2, the vector gray determination unit 106 first performs the determination of Step S303 on Vector 1. As a result of the analysis, Vector 1 turns out to be a chromatic color. Therefore, the vector gray determination unit 106 extracts Vector 1 as the vector object that is not gray (S303: chromatic color). At this point in time, the vector gray flag setting unit 111 sets the vector gray flag to "OFF" (S304) and the vector gray analysis ends.

Then the multicolor/monochrome specifying unit 109 performs the flag determination of Step S206 as illustrated in FIG. 2.

Herein, as a result of the above-mentioned vector gray analysis, the vector gray flag is set to "OFF" (S206: OFF). All of the objects are then subjected to a color conversion using the multicolor table (S207).

Figure 8:
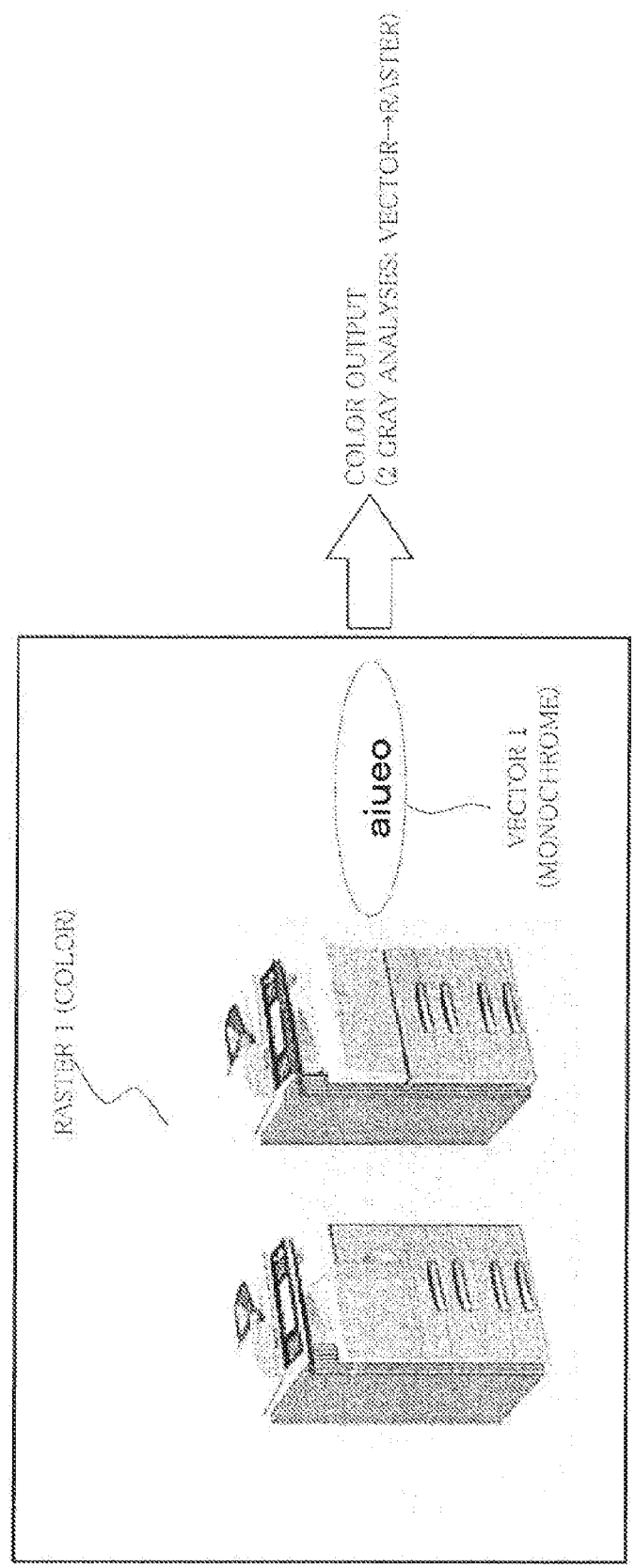
FIG. 8 illustrates an example of the image data subjected to the color conversion process by the image forming apparatus according to the embodiment of FIG. 2 of the present invention.

Referring now to FIG. 8, Page 3 is an example of image data in which a vector object (characters) formed only of gray and a raster object (photograph) including a chromatic color coexist.

The procedure for the image processing for this situation is illustrated in the flowchart of FIG. 2.

First, in the same manner as the previous situation for Page 1 or Page 2, all of the object data included in Page 3 are read (S201 to S203).

Using this process, Raster 1 (chromatic color) and Vectors 1 (gray) are extracted. The drawing data storage unit 103 then stores data on each object in the memory. Note that Vector 1, that is, the characters that read "aiueo" are black, and have a color value of "RGB (0, 0, 0)".

Subsequently, the gray analysis is performed on Page 3 (S204).

In the same manner as in the previous situation, first the vector gray analysis (S205) is performed, details of which are illustrated in FIG. 3.

Of the Vectors on Page 3, the vector gray determination unit 106 performs the determination of Step S303 on Vector 1.

As a result, the vector gray determination unit 106 determines that Vector 1 is gray (S303: gray). The vector gray flag setting unit 105 sets the vector gray flag to "ON" (S305) and the vector gray analysis ends.

As illustrated in FIG. 2, the multicolor/monochrome specifying unit 109 then performs the flag determination of Step S206. Herein, because of the above-mentioned vector gray analysis, the vector gray flag is set to "ON" (S206: ON). Accordingly, the raster gray analysis is then performed (S208).

With respect to the raster gray analysis, Step S403 illustrated in FIG. 4 is of importance.

Of the Vectors on Page 3, the raster object is only Raster 1 and is of a chromatic color. Therefore, the raster gray determination unit 107 extracts Raster 1 as the raster object that is not gray (S403: chromatic color). At this point, the raster gray flag setting unit 112 sets the raster gray flag to "OFF" (S404) and the raster gray analysis ends.

The multicolor/monochrome specifying unit 109 then performs the flag determination of Step S209 as illustrated in the flowchart of FIG. 2.

Herein, as a result of the above-mentioned raster gray analysis, the raster gray flag is set to "OFF" (S209: OFF). All of the objects are then subjected to a color conversion using the multicolor table (S207).

Figure 9:
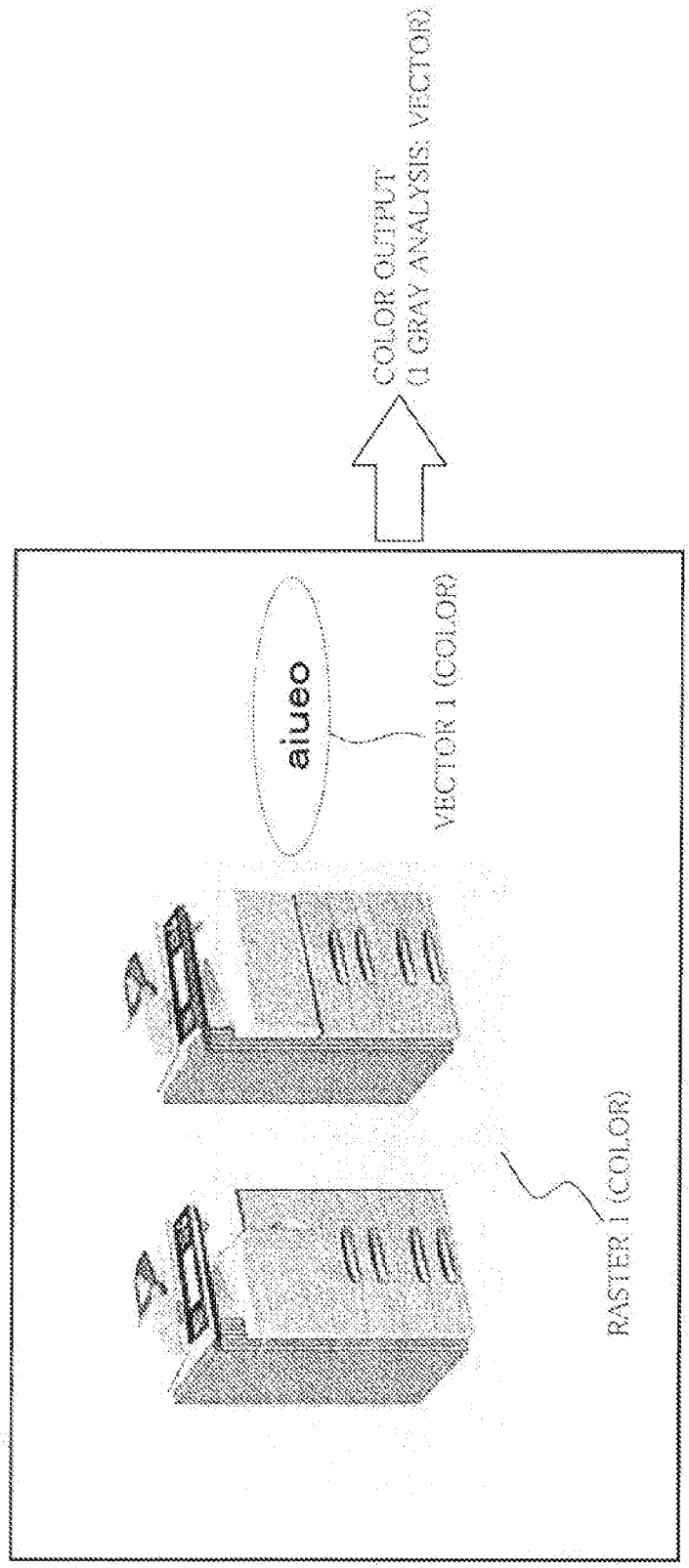
FIG. 9 illustrates an example of the image data subjected to the color conversion process by the image forming apparatus according to the embodiment of FIG. 2 of the present invention.
Figure 10:
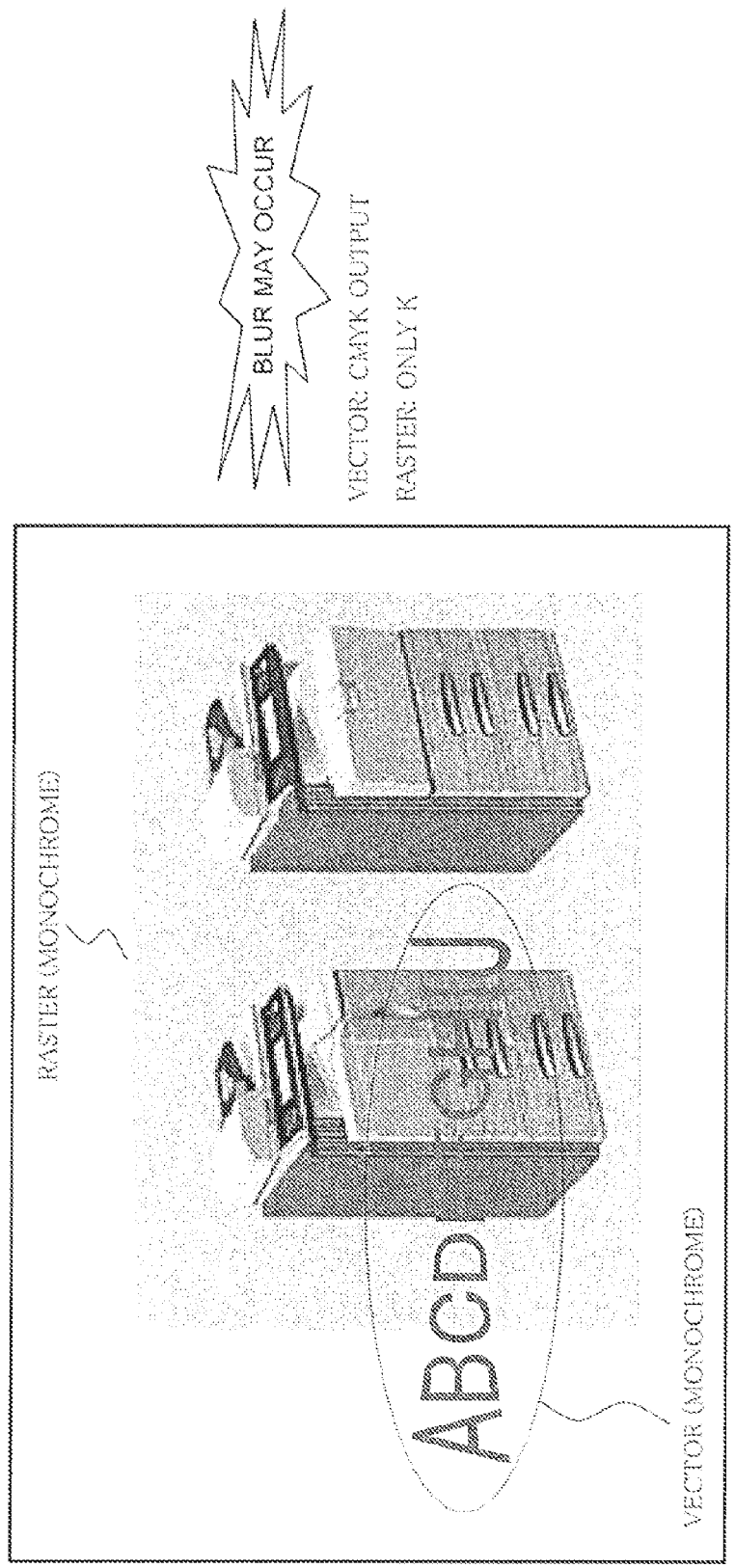
FIG. 10 is a reference diagram illustrating a problem that can occur in a general color conversion process.

As illustrated in FIG. 9, Page 4 is an example of image data wherein vector objects (characters) including a chromatic color, and a raster object (photograph) including a chromatic color coexist.

The procedure for the image processing for this situation is described by referring to the flowchart of FIG. 2.

First, in the same manner as the previous situations for Pages 1 to 3, all of the object data included in Page 4 are read (S201 to S203).

Using two processes, Raster 1 (chromatic color) and Vectors 1 (chromatic color) are extracted. The drawing data storage unit 103 then stores data on each object in the memory. Note that Vector 1, that is, the characters that read "aiueo" are red, and have a color value of "RGB (255,0,0)".

Subsequently, the gray analysis is performed on Page 4 (S204).

In the same manner as the previous situations, first a vector gray analysis (S205) is performed, details of which are illustrated in FIG. 3.

Of the Vectors on Page 4, the vector gray determination unit 106 performs the determination on Vector 1.

As a result, Vector 1 is determined to be a chromatic color, and hence the vector gray determination unit 106 extracts Vector 1 as the vector object that is not gray (S303: chromatic color). At this point, the vector gray flag setting unit 111 sets the vector gray flag to "OFF" (S304) and the vector gray analysis ends.

The multicolor/monochrome specifying unit 109 then performs the flag determination of Step S206 as illustrated in the flowchart of FIG. 2.

Herein, as a result of the above-mentioned vector gray analysis, the vector gray flag is set to "OFF" (S206: OFF). All of the objects are then subjected to a color conversion using the multicolor table (S207).

As described above, the image forming apparatus 1 according to this embodiment is configured so that the drawing data storage unit 103 can automatically determine even image data including a gray object.

Then, when all of subject objects are gray, the multicolor/monochrome specifying unit 109 and the output data creation unit 110 performs a color output in a single color of K (black). Therefore, not only the raster object, but, also the vector object, when gray, can be output in K (black).

This affords more opportunities to perform a single-color processing than in the prior art. It also makes it possible to reduce the usage of saved memory and perform higher speed image processing. An image which is originally to be output in a CMYK color mixture may be output in the single K color instead. This allows for a reduction in CMY-plane processing time.

Further, when a three-dimensional multicolor table calculation for RGB→CMYK, 8-point interpolation, 4-point interpolation, or the like is necessary, a single-color processing allows a one-dimensional table processing or a matrix processing to further reduce the necessary calculations, therefore preventing the wasteful use of memory and allows for higher speed image processing.

Additionally, the multicolor image processing is performed even when only one of the subject objects includes a chromatic color, the higher speed can also be achieved for the multicolor processing.

Alternatively, in the procedure for the gray analysis, the raster gray analysis may be performed before performing the vector gray analysis.

Memory consumption may also be saved by performing the vector gray determination and the raster gray determination simultaneously with the reading out of the object data.

Figure 11:
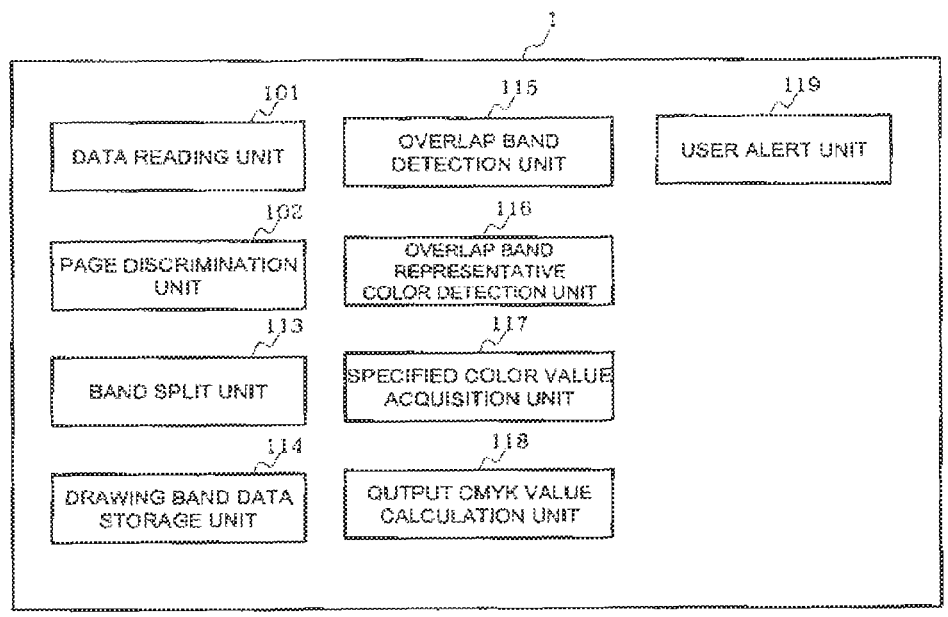
FIG. 11 is a functional block diagram illustrating a configuration of an image forming apparatus according to another embodiment of the present invention.

FIG. 11 is a functional block diagram illustrating a configuration of an image forming apparatus according to another embodiment of the present invention.

An image forming apparatus 1, according to this embodiment, includes units as illustrated in FIG. 11. The image forming apparatus 1 implements the functions of the units by executing a program. The program and the computer have the same configurations as those of the previous embodiment.

The data reading unit 101 and the page discrimination unit 102 are the same as those of the previous embodiment.

A band split unit 113 divides drawing data received after the start of the page into bands, appends the distinguishing label of "vector" or "raster" to each of objects that comprise the drawing data, and classifies the objects into vector objects and raster objects for each band.

Figure 14:
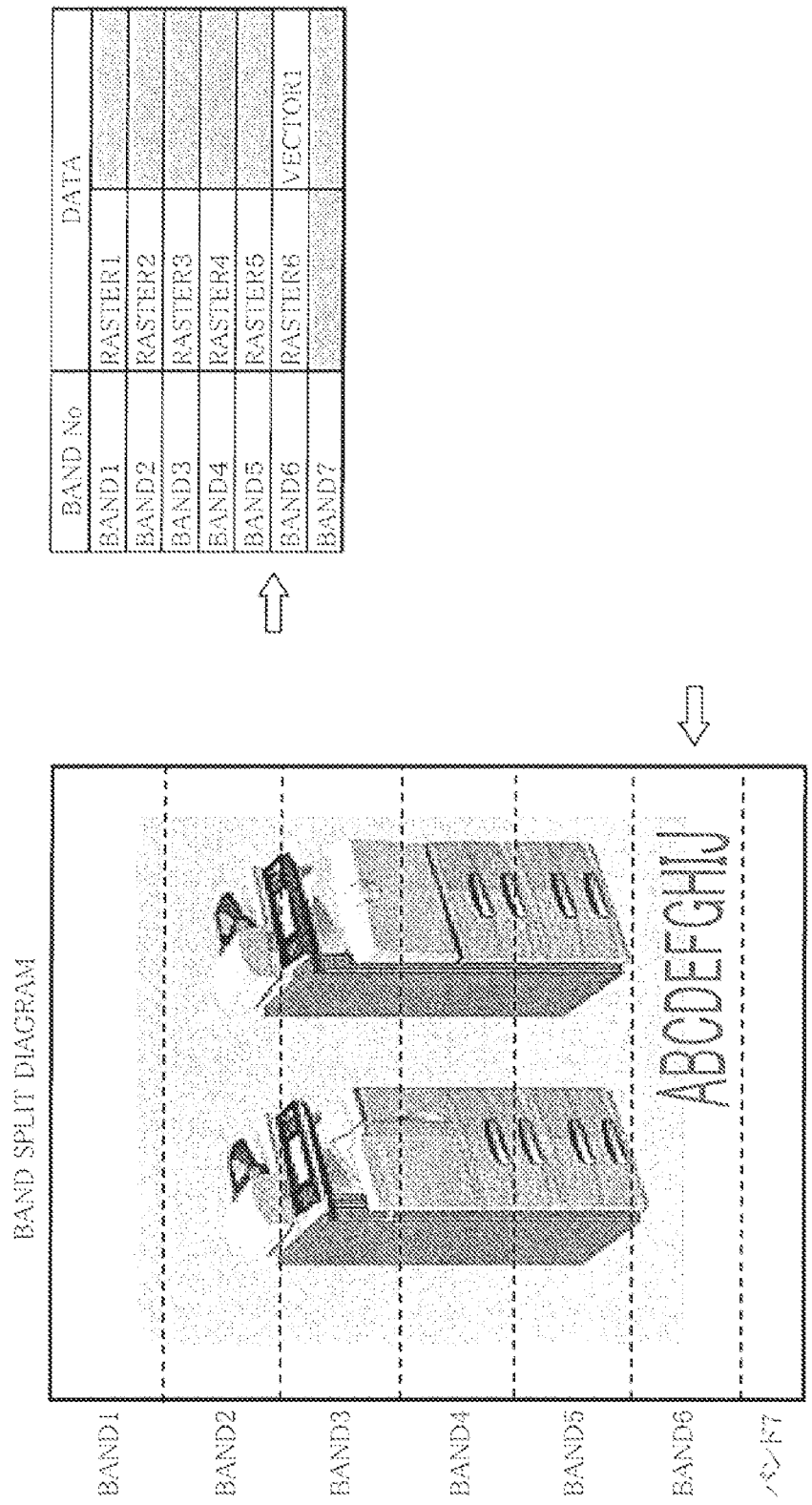
FIG. 14 is a diagram of band split and band data storage that are performed by the image forming apparatus according to the embodiment of FIG. 11 of the present invention.

The term "band split" is to divide (or split) the image data into a plurality of areas on a page by page basis. For example, as illustrated in FIG. 14, a plurality of band areas may be set to have the same split width, or the band areas may be set to have different split widths.

A drawing band data storage unit 114 stores the vector object and the raster object of each band obtained by the band split unit 113 in a storage unit (not shown).

An overlap band detection unit 115 determines whether or not there is a band having an overlap between the vector object and the raster object when the end of the page is recognized, and detects such an overlap band when there is one.

Note that the determination of an overlap between the vector object and the raster object can be performed easily by comparing coordinate values added to the respective object data with each other.

An overlap band representative color detection unit 116 determines and detects a representative color of the raster object existing in the overlap band.

Specifically, color values of all of the pixels in the overlap band can be detected, followed by a statistical analysis on a color value basis. The color value having the highest frequency of occurrence can be set as the representative color.

Alternatively, a representative color can be obtained not for all of the pixels in the overlap band, but only for an overlapping portion.

In particular, in a situation where it appears that the colors of the raster object continuously extend from the overlapping portion between the raster object and the vector object to the vicinity thereof, by detecting the color values of the pixels comprising the overlapping portion and obtaining a representative color of the raster object based on a statistical analysis, it is possible to determine the representative color with accuracy while reducing the processing load and processing time.

A specified color value acquisition unit 117 acquires a color value of a subject vector object. In particular, the specified color value acquisition unit 117 extracts a necessary color value from the color registration table, such as a pallet or an index table in the situation where a color value is not directly specified for the object.

An output CMYK value calculation unit (output color value calculation unit) 118 calculates an output CMYK value as the color value of the vector object in the overlapping area and an output CMYK value as the representative color of the raster object, by referencing predetermined color conversion tables corresponding to each that are stored in the storage unit (not shown), e.g., memory.

Specifically, the output CMYK value calculation unit 118 calculates the output CMYK value of the vector object as the RGB value (color value) thereof by referencing a first color conversion table (vector color table), and calculates the output CMYK value of the raster object as the RGB value of the representative color by referencing a second color conversion table (raster color table).

As noted above, more and more image forming apparatuses have recently been provided with different color conversion tables separately for the vector object and the raster object. This is due to a difference in concept of the objects. For example, the raster object formed of a natural image, a photograph, and the like needs to be reproduced in the more natural colors the human eye sees. The vector object formed of characters, lines, and the like needs to be reproduced in sharper colors. Therefore, it is considered difficult to optimally reproduce both the raster object and the vector object by using one color conversion table.

A user alert unit 119 (visibility determination unit) issues an alert to a user when it is determined that the visibility is to be less in a situation where the output CMYK value of the vector object and the output CMYK value of the raster object that are obtained by the output CMYK value calculation unit 118 are the same.

Whether or not the output CMYK values are the same is determined by the above-mentioned difference (color difference) between the output CMYK values calculated by the output CMYK value calculation unit 118. That is, when the color difference is zero, it is determined that the two output CMYK values are the same.

Further, the output CMYK values can be assumed to be the same when the color difference is within a predetermined threshold value range.

The alert may be a predetermined message (for example that the visibility is less due to an assimilation of colors) displayed on a display screen such as a monitor, and a preview image of a subject band may also be displayed along with the message.

Note that in a printing system including a personal computer (hereinafter, abbreviated as "PC") and a printer, where an image processing program according to the present invention is installed on the PC as a driver, the alert message may be displayed on the monitor screen of the PC. In another situation where the printer (image forming apparatus) is provided with the configuration according to the present invention, the alert message can be transmitted to the PC to thereby issue an alert through the monitor screen of the PC.

Figure 12:
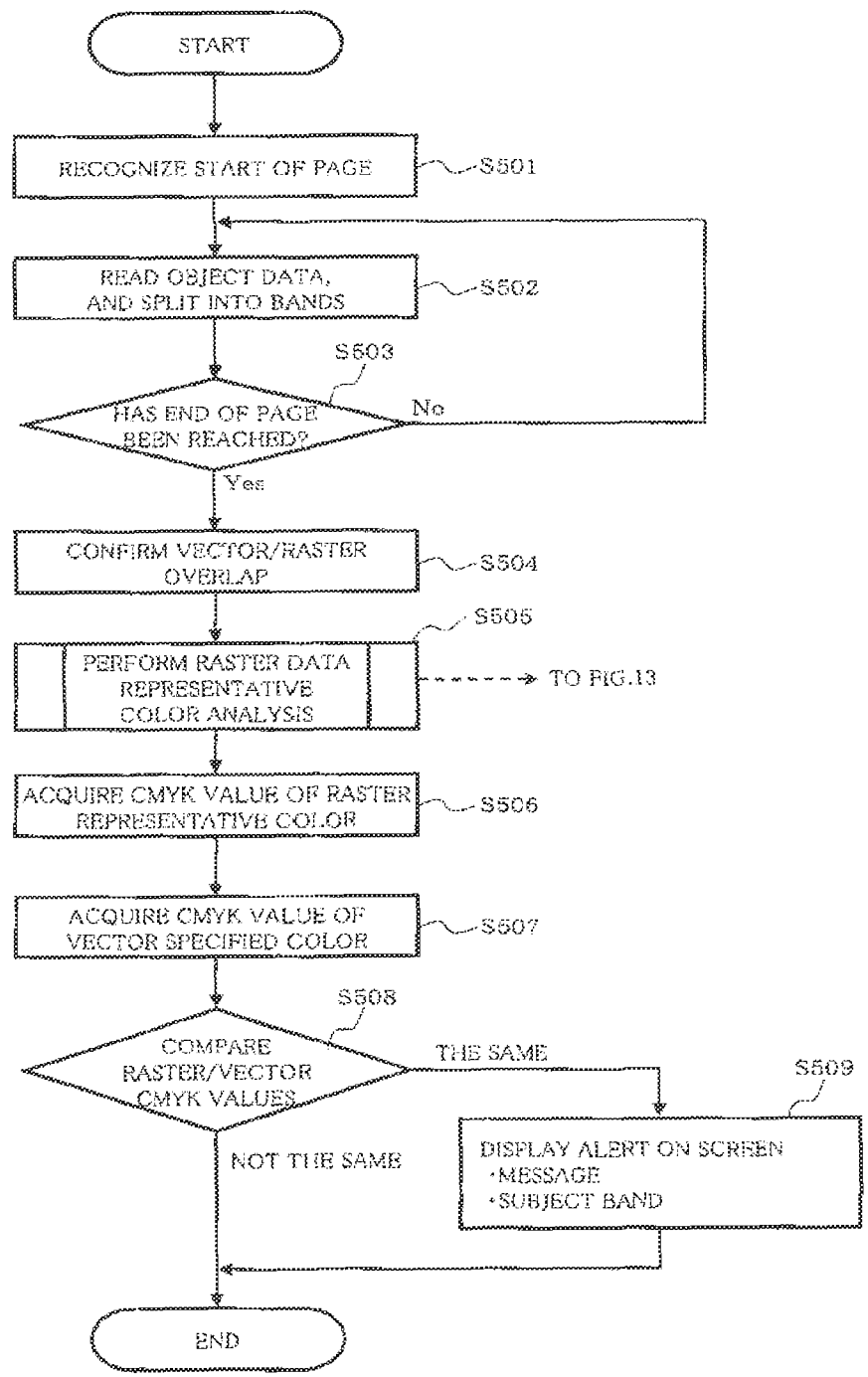
FIG. 12 is a flowchart illustrating an operation procedure performed by the image forming apparatus according to the embodiment of FIG. 11 of the present invention.

Referring now to FIG. 12, a description is made of an operation procedure performed by an image forming apparatus according to the embodiment having such the above-described configuration.

FIG. 12 is a flowchart illustrating the operation procedure performed by the image forming apparatus 1 according to this embodiment.

As illustrated in FIG. 12, first, the data reading unit 101 of the image forming apparatus 1 reads PDL data on a predetermined page. Then, the page discrimination unit 102 determines the start of the page (S501).

The band split unit 113 then divides the page into a plurality of bands, and appends the distinguishing label to each of object data included in each band by vector/raster. The drawing band data storage unit 114 stores these vector objects and raster objects into the memory (S502).

FIG. 14 is an explanatory diagram of the band split and band data storage that are performed by the image forming apparatus according to this embodiment.

Specifically, as illustrated in FIG. 14, the band split unit 113 divides the subject image data into Bands 1 to 7 (left half of FIG. 14). The drawing band data storage unit 114 stores the vector object and raster objects that are extracted based on the band, in the memory (right half of FIG. 14).

Note that the band split and the reading of the object data are continuously performed (S503: NO) until all of the object data on the page have been read.

Then, when all of the object data included in the page have been read (S503: YES), the overlap band detection unit 115 confirms an overlap between the vector object and the raster object, and identifies the overlap band (S504).

In the case of this embodiment, as illustrated in FIG. 14, an overlap is confirmed between Vector 1 (a part of "ABCDEFGHIJ") and Raster 6 (a part of the photograph). Band 6, that is the area including the overlap is identified as the overlap band.

The image forming apparatus 1 then, according to this embodiment, performs a representative color analysis on the raster object (S505).

Figure 13:
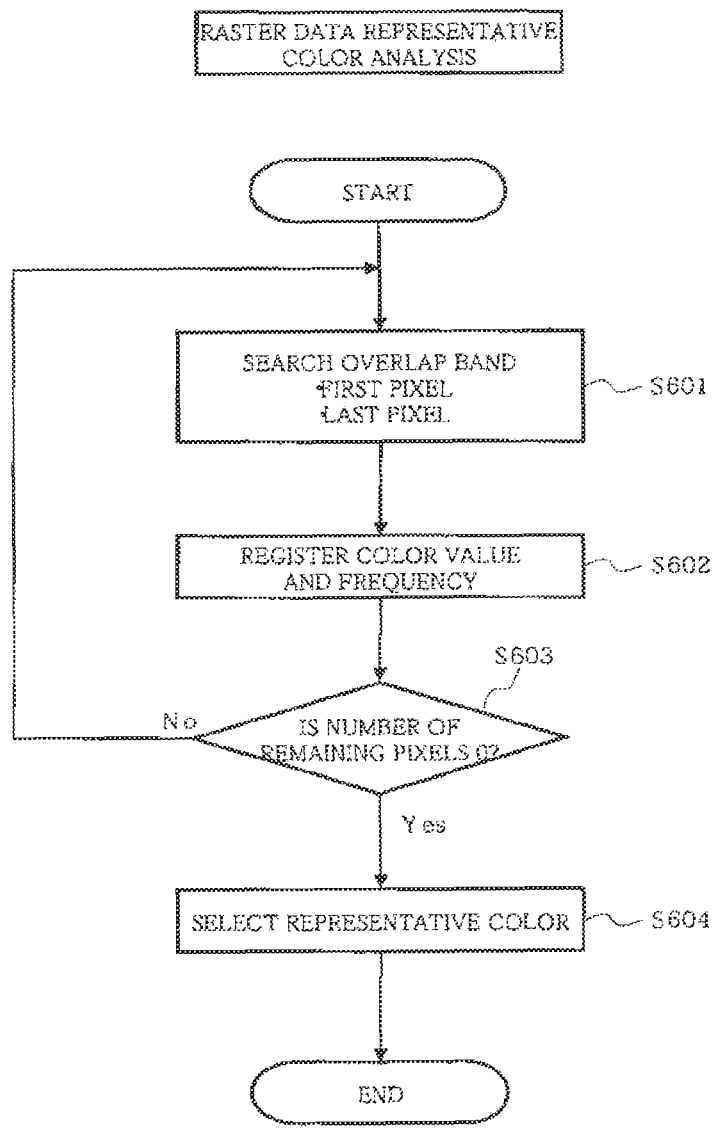
FIG. 13 is a flowchart illustrating a procedure for analyzing a representative color of the raster object which is performed by the image forming apparatus according to the embodiment of FIG. 11 of the present invention.

Referring now to FIG. 13, a description of an operation procedure related to the representative color analysis on the raster object performed according to this embodiment will be provided.

FIG. 13 is a flowchart illustrating a procedure for the representative color analysis performed by the image forming apparatus according to this embodiment. As illustrated in FIG. 13, in the representative color analysis for the raster object, first, the overlap band representative color detection unit 116 searches all of the pixels in the overlap band (S601).

Specifically, the overlap band representative color detection unit 116 detects all of color values of from the first pixel to the last pixel in the overlap band, and stores the color values in the memory.

In order to perform a statistical analysis on the color values of all of the pixels in the overlap band, the overlap band representative color detection unit 116 extracts from the memory and determines the color value of each pixel and the frequency thereof (S602).

Note that Steps S601 and S602 are repeatedly executed (S603: NO) until no pixel is left unprocessed in the overlapping area.

In Step S603, when no pixel is left unprocessed (S603: YES), the overlap band representative color detection unit 116 determines a color value having the maximum detection frequency as the representative color of the raster object (S604).

Note that as described above, it is preferable in Step S604 that the overlap band representative color detection unit 116 may determine the representative color by collecting the statistics on the color values of all of the pixels in the overlap band. In another method, the overlap band representative color detection unit 116 can determine the representative color of the raster object based on the statistics on the color values of the overlapping portion between the vector object and the raster object.

Accordingly, in a situation where, for example, it appears that the colors continuously extend from the overlapping portion to the vicinity thereof, the representative color can accurately be determined while reducing the number of pixels to be collected in the statistics, which makes it possible to efficiently obtain the representative color without wasting processing time.

Referring to FIG. 12, the output CMYK value calculation unit 118 then acquires a CMYK value corresponding to the representative color of the raster object in the overlapping area selected in Step S505 (S506).

Figure 18:
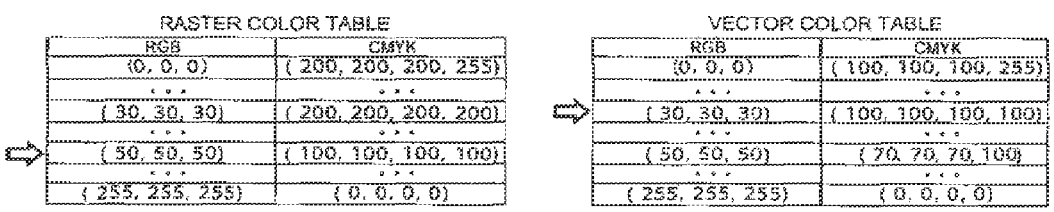
FIG. 18 is an example of a raster color table and a vector color table.

In this embodiment, when the overlap band representative color detection unit 116 selects RGB (50, 50, 50) as the representative color of Raster 6 in the overlapping area, the output CMYK value calculation unit 118 references the raster color table (first color conversion table according to the present invention) illustrated in FIG. 18.

By this process, CMYK (100, 100, 100, 100) is obtained by the output value.

Subsequently, the output CMYK value calculation unit 118 acquires the CMYK value corresponding to the color value of the vector object (second color conversion table according to the present invention) in the overlapping area (S507).

Note that the color value used for the vector object may be the object data itself, or may be a specified color value extracted by the specified color value acquisition unit 117 from the palette in which color values are registered in advance.

In this embodiment, when the color value of Vector 1 is RGB (30, 30, 30), the output CMYK value calculation unit 118 acquires CMYK (100, 100, 100, 100) as the output value by referencing the vector color table illustrated in FIG. 18.

The user alert unit 119 then compares the CMYK values calculated in Steps S506 and S507 with each other (S508).

Specifically, the difference (color difference) between the CMYK value corresponding to the representative color of the raster object and the CMYK value corresponding to the color value of the vector object is obtained. When the CMYK values are the same, the procedure advances to Step S509 (S508: the same), and when they are not the same (S508: not the same), the procedure ends.

In the case of this embodiment, as described above, the CMYK values are both CMYK (100, 100, 100, 100), and hence the color difference is 0 (zero).

Note that in determining whether or not the CMYK values are the same, the CMYK values can be assumed to be the same even when the color difference is minute, not to mention when the color difference is 0.

For example, when a predetermined threshold value range has been set in advance, it is possible to determine that the CMYK values are assumed to be the same when the color difference is within the range.

For example, the predetermined threshold value range may be set as a range within a color difference of 1.5 in the L*a*b* color system corresponding to "Trace" or "Slight" based on the criteria for sensory expression in terms of National Institute of Standards and Technology (NIST) units. In this situation, the user alert unit 119 converts the two CMYK values into L*a*b* values to calculate the color difference. When the color difference is within 1.5, the unit determines that the CMYK values are assumed to be the same.

Alternatively, where two colors are of a similar shade and hard to visually recognize even, though there is a color difference to some extent, the predetermined threshold value range may be set as a range within the color difference of, for example, 10 in the L*a*b* color system.

Note that with a color conversion table, in which L*a*b* values corresponding to CMYK values are recorded, having been prestored in a storage unit (not shown) such as a memory, the conversion of the CMYK values into the L*a*b* values may be performed by the user alert unit 119 referencing the color conversion table.

When, in Step S508, the CMYK values are recognized as being the same (S508: the same), the user alert unit 119 causes the monitor to display thereon an alert that visibility may be reduced due to a possible occurrence of color assimilation during printing (S509).

Figure 15:
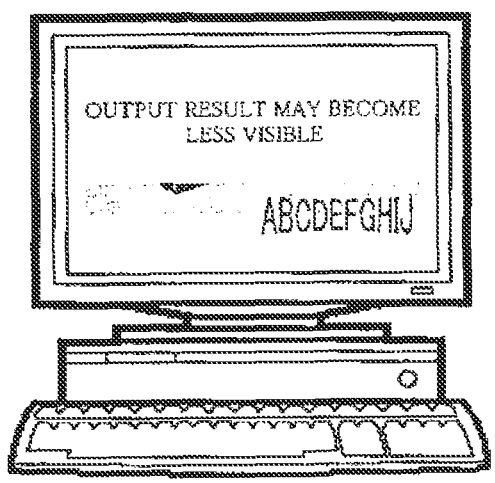
FIG. 15 is a front view of a monitor that is displaying an example of an alert issued by the image forming apparatus according to the embodiment of FIG. 11 of the present invention.

FIG. 15 is a front view of the monitor displaying an example of the alert issued by the image forming apparatus according to this embodiment. For example, as illustrated in FIG. 15, the user alert unit 119 causes the monitor to display thereon an alert message that "Output result may Become Less Visible" or other such alert message.

Further, as illustrated in FIG. 15, a preview image of a subject overlap band may also be displayed along with the alert message. This makes it possible to accurately and rapidly recognize the overlapping area that can cause the color assimilation.

As described above, in the image forming apparatus 1 according to this embodiment, the band split unit 113 first divides a page into a plurality of bands, and causes each of objects divided by the page splitting to be formatted so as to allow the object to be distinguished between the vector object and the raster object. After that, the drawing band data storage unit 114 stores this data in the storage unit.

The overlap band detection unit 115 then detects an overlap band, including an overlapping area between the vector object and the raster object. Then, the overlap band representative color detection unit 116 and the specified color value acquisition unit 117 acquires the representative color of the raster object and the color value of the vector object in the overlap band.

The output CMYK value calculation unit 118 calculates the CMYK values corresponding to the acquired representative color of the vector object and the acquired color value of the raster object, and obtains the color difference therebetween.

Then, the user alert unit 119 assumes that the output color values are the same when the color difference is 0 (zero), or within a predetermined threshold value range, and issues an alert to the user. Note that the user, who has received the alert, may take a number of actions including canceling the processing and manually changing the output CMYK values.

Accordingly, it is possible to prevent the overlapping portion between objects in an output image from becoming less visible due to having the same color as the vicinity thereof, which has been a problem in the prior art. As a result, the wasting of paper can be prevented. Not only does this save memory, it is also environmentally friendly.

Further, it should be noted that various kinds of determination and control are performed on a band basis. This enables high speed processing. Additionally, the present invention can be accomplished by simple methods such as changing or adding of a program.

Figure 16:
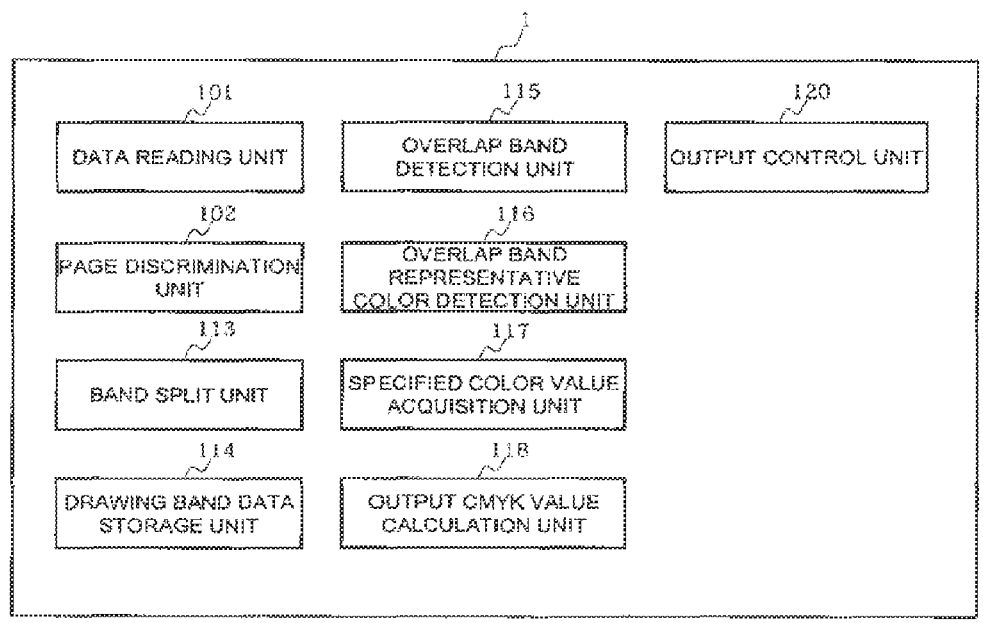
FIG. 16 is a functional block diagram illustrating a configuration of an image forming apparatus according to a further embodiment of the present invention.
Figure 17:
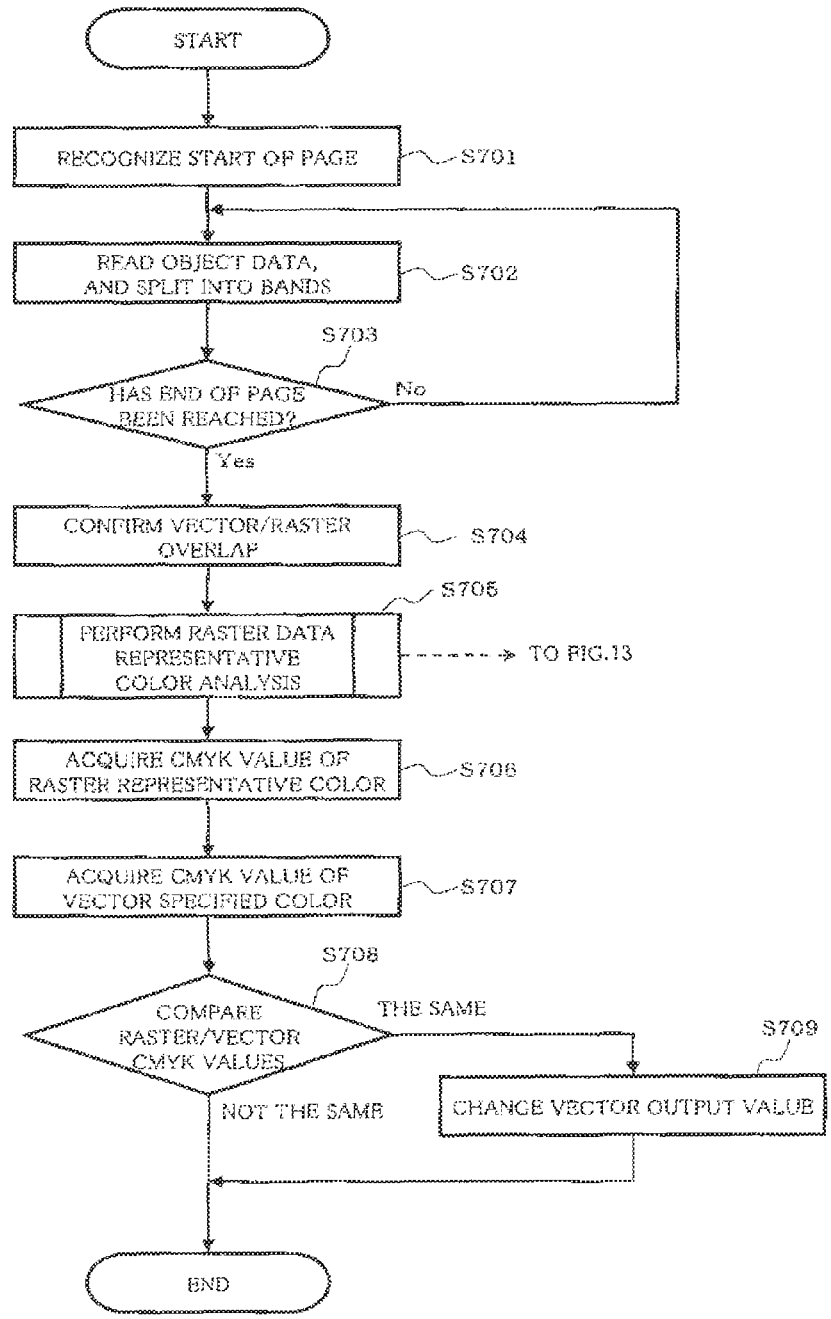
FIG. 17 is a flowchart illustrating an operation procedure for the image forming apparatus according to the embodiment of FIG. 16 of the present invention.

Referring now to FIGS. 16 and 17, a description of an image forming apparatus according to another embodiment of the present invention will now be provided.

FIG. 16 is a functional block diagram illustrating a configuration of an image forming apparatus according to this embodiment.

As illustrated in FIG. 16, the image forming apparatus, according to this embodiment, has substantially the same configuration as that of the above-mentioned embodiment except that the image forming apparatus includes an output control unit 120 (visibility determination unit).

When the color difference between the output CMYK value corresponding to the representative color of the raster object and the output CMYK value corresponding to the color value of the vector object, which have been calculated by the output CMYK value calculation unit 118, is 0 (zero) or within a predetermined threshold value range, the output control unit 120 determines that the visibility is reduced, and automatically changes the output CMYK value of the vector object. In this embodiment, the predetermined threshold value range may be same as the second embodiment.

For example, the output control unit 120 adjusts the output CMYK value by adding a fixed value to the CMYK value of the vector object or subtracting a fixed value so that the color difference is within a range of between 1.5 and 3.0 in the L*a*b* color system corresponding to "Noticeable" on the criteria for sensory expression in terms of NIST units. Such an adjustment of the CMYK value may be performed by dynamic setting in accordance with the output CMYK value. Or it may be performed by adding/subtracting a predetermined fixed value.

The CMYK value not only of the vector object but also of the raster object may be changed and the adjustment may be performed by a method of changing both the CMYK values.

FIG. 17 is a flowchart illustrating an operation procedure for the image forming apparatus according to this embodiment.

As illustrated in FIG. 17, the operation procedure is substantially the same as that of the above-mentioned embodiment except that the process of Step S709 is different from Step S509 according to the above-mentioned embodiment. That is, in the above-mentioned embodiment, an alert is issued to the user in a typical case, while in this embodiment, the output control unit 120 automatically changes the vector output value as described above.

As described above, the image forming apparatus according to this embodiment not only provides the same effects as the above-mentioned embodiment, but also is configured so that the image forming apparatus itself changes the output CMYK value in a typical situation.

Therefore, in the same manner as the above-mentioned embodiment, it is possible to further improve the convenience of the device and system because it is not necessary for the user to take action. Moreover, it is possible to prevent a malfunction caused in the output image due to color assimilation or the like.

Note that in the above-mentioned embodiment and the previous one, the user alert unit 119 and the output control unit 120 obtain the color difference based on the CMYK values or the L*a*b* values, but the present invention is not limited thereto. For example, the color difference may be obtained by using a predetermined formula based on values in another color system such as L*u*v* color system.

Further, the visibility determination unit may serve as both the user alert unit 119 and the output control unit 120. In that case, after the user alert unit 119 executes the process of Step S209 of FIG. 12 causing the monitor to display thereon an alert message that "Because this may become less visible, the color of this portion will be adjusted" or other such alert message, the output control unit 120 may additionally perform the same processing as Step S709.

The present invention is effectively particularly in the case of an object having an achromatic color, but also may be effective for an object having a chromatic color.

In part, in an embodiment, the invention may be summarized as follows.

An image forming apparatus according to an embodiment of the present invention comprises a reading unit, a drawing data storage unit, a vector gray determination unit, a raster gray determination unit, and an output data creation unit. The reading unit reads image data. The drawing data storage unit stores object data comprising the read image data so as to allow the stored object data to be distinguished between a vector object and a raster object. The vector gray determination unit determines whether or not each of stored vector objects is formed of an achromatic color. The raster gray determination unit determines whether or not each of stored raster objects is formed of an achromatic color. The output data creation unit converts the stored object data into multicolor when the stored object data includes a chromatic color, and converts the stored object data into monochrome when the stored object data is formed only of achromatic colors. Herein, the data reading unit may read the image data on a page by page basis.

The thus-configured image forming apparatus, according to the present invention, allows a single-color output for not only the raster object, but also the vector object.

Accordingly, time and labor for performing a color processing on an object in an achromatic color can typically be saved, which can achieve higher speeds for image processing.

Further, the object in the achromatic color can be expressed as a single color, which allows a sharper image to be outputted.

In particular, even in the case where there is an overlap between the vector object and the raster object, it is possible to prevent the occurrence of a blur and realize a high quality output.

Further, in addition to the above-mentioned configuration, when one or more vector objects among the stored vector objects are not formed of an achromatic color, the output data creation unit may output the vector object by converting the one or more vector object into multicolor.

With this configuration, when one or more vector objects are formed of a chromatic color, an image output is normally performed by color conversion.

Accordingly, at an early stage in the process, a color/monochrome discrimination can occur, which can reduce the processing time.

Further, in addition to the above-mentioned configuration, color values of the image data may be formed of RGB values, and when the RGB value of the vector object satisfies "R=G=B", the vector gray determination unit determines that the vector object is in the achromatic color.

Such a configuration provides a method that makes it possible to easily determine whether or not the vector object is in the achromatic color.

In addition to the above-mentioned configuration, the output data creation unit may further output the stored object data by converting the stored object data into one of a CMY value and a CMYK value. When all of the stored object data are formed of achromatic colors, the output data creation unit may perform a color output in K (black).

In addition to the above-mentioned configuration, the image forming apparatus may further include a vector gray flag setting unit and a raster gray flag setting unit. Herein, the vector gray flag setting unit sets a vector gray flag when all of the stored vector objects are formed of achromatic colors. In a similar manner, the raster gray flag setting unit sets a raster gray flag when all of the stored raster objects are formed of achromatic colors. In such a situation, the output data creation unit is designed to perform a color output based on multicolor when one of the vector gray flag and the raster gray flag is not set and perform a color output based on monochrome when the vector gray flag and the raster gray flag are both set.

With such a design, it can be determined whether or not the object is in the achromatic color according to a flag setting, and an appropriate image processing can be performed based on the determination.

Accordingly, the image forming apparatus according to the present invention can be achieved with a simple design without the need for a complicated circuit structure, algorithm, or the like.

An image forming apparatus according to another embodiment of the present invention comprises a data reading unit, a band split unit, an overlap band detection unit, a specified color value acquisition unit, an overlap band representative color detection unit, an output color value calculation unit, and a visibility determination unit. The data reading unit reads image data. The band split unit divides the read image data into a plurality of bands allowing each of object data comprising the image data to be distinguished between a vector object and a raster object. The overlap band detection unit identifies a band having an overlap between the vector object and the raster object. The specified color value acquisition unit determines a color value of a vector object existing in the overlap band. The overlap band representative color detection unit determines a representative color of a raster object existing in the overlap band. The output color value calculation unit calculates an output color value corresponding to the color value of the vector object and an output color value corresponding to the representative color of the raster object. The visibility determination unit determines a visibility of an overlapping portion based on a comparison of output color values.

Herein, the data reading unit reads the image data on a page by page basis. The overlap band representative color detection unit may determine the representative color of the raster object based on pixels within the overlap band. The visibility determination unit may compare the output color value of the vector object and the output color value of the raster object, and determines a visibility of an overlapping portion based on the comparison.

Further, the visibility determination unit may calculate a color difference between the output color value of the vector object and the output color value of the raster object that are calculated by the output color value calculation unit. When the color difference is 0 (zero) or within a predetermined threshold value range, may notify of a alert.

With this design, it is highly possible for color assimilation to occur when the output color values of the vector object and the raster object overlapping each other are the same, or nearly the same, and hence the user can be notified to that effect in advance. This can avoid the generation of an image that is not sharp.

Further, the wasteful consumption of paper can be prevented, which is also environmentally friendly.

The determination of an overlap between objects and the analysis/determination/processing of the color values are performed on a band basis, which therefore enables a smooth processing with reduced processing load.

Accordingly, the present invention can provide an image forming apparatus that can indirectly provide improved quality in the outputted product and high speed processing.

Further, in addition to the above-mentioned configuration, the image forming apparatus may further include a first color conversion table for converting the color value of the vector object into a output color value and a second color conversion table for converting the representative color of the raster object into a output color value. Herein, the output color value calculation unit calculates the output color value corresponding to the color value of the vector object using the first color conversion table and calculates the output color value corresponding to the representative color of the raster object detected by the overlap band representative color detection unit using the second color conversion table.

Accordingly, in the image forming apparatus including the color conversion tables that are different from the vector object and the raster object, when the output color values of the vector object and the raster object overlapping each other are the same, or nearly the same, it is possible to avoid the generation of an image that is not sharp.

In addition to the above-mentioned configuration, the visibility determination unit can calculate a color difference between the output color value of the vector object and the output color value of the raster object, that are calculated by the output color value calculation unit, and when the color difference is 0 (zero) or within a predetermined threshold value range, may output color values after performing either an addition or subtraction of a fixed value to/from one or plurality of the output color value of the vector object and the output color value of the raster object.

With this configuration, when the color difference between the output color values of the vector object and the raster object within the overlapping area is 0 (zero), or within the predetermined threshold value range, both or one of the output color values can automatically be changed.

Accordingly, the image forming apparatus itself can automatically adjust the output color values to avoid problems with visibility without the need to notify the user.

In addition to the above-mentioned configuration, the overlap band representative color detection unit may extract and count color values of all of the pixels within the overlap band. The unit can detect a color value that has the highest count value and use it as the representative color.

With this configuration, based on a statistical analysis of the color values within the overlap band, a representative color thereof can be determined. That is, it is possible to extract and count the color values of all of the pixels within the overlap band and obtain the color value having the greatest count value as the representative color of the raster object.

Accordingly, it is possible to rationally obtain a representative color using a simple method.

In addition to the above-mentioned configuration, the overlap band representative color detection unit may extract and count color values of the pixels of the overlapping portion and can use a color value whose count value is the largest as the representative color.

With this configuration, based on the statistical analysis of the color values of the overlapping portion, between the raster object and the vector object within the overlap band, a representative color thereof can be determined.

Accordingly, the load caused by a statistical processing can be reduced, and the time to determine a representative color can be reduced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus, comprising:
   a data reading unit that reads image data;
   a band split unit that divides the read image data into a plurality of bands allowing each of object data comprising the image data to be distinguished between a vector object and a raster object;
   an overlap band detection unit that identifies a band having an overlap between the vector object and the raster object;

a specified color value acquisition unit that determines a color value of a vector object existing in the overlap band;

an overlap band representative color detection unit that determines a representative color of a raster object existing in the overlap band;

an output color value calculation unit that calculates an output color value corresponding to the color value of the vector object and an output color value corresponding to the representative color of the raster object; and a visibility determination unit that determines a visibility of an overlapping portion based on a comparison of output color values.

2. The image forming apparatus according to claim 1, wherein the data reading unit reads the image data on a page by page basis.

3. The image forming apparatus according to claim 1, wherein the overlap band representative color detection unit determines the representative color of the raster object based on pixels within the overlap band.

4. The image forming apparatus according to claim 1, wherein the visibility determination unit compares the output color value of the vector object and the output color value of the raster object, and determines a visibility of an overlapping portion based on the comparison.

5. The image forming apparatus according to claim 1, wherein the visibility determination unit calculates a color difference between the output color value of the vector object and the output color value of the raster object that are calculated by the output color value calculation unit, and when the color difference is 0 (zero) or within a predetermined threshold value range, notifies of an alert.

6. The image forming apparatus according to claim 1, comprising:

a first color conversion table for converting the color value of the vector object into a output color value; and a second color conversion table for converting the representative color of the raster object into a output color value, wherein:

the output color value calculation unit calculates the output color value corresponding to the color value of the vector object using the first color conversion table; and the output color value calculation unit calculates the output color value corresponding to the representative color of the raster object detected by the overlap band representative color detection unit using the second color conversion table.

7. The image forming apparatus according to claim 1, wherein the visibility determination unit calculates a color difference between the output color value of the vector object and the output color value of the raster object that are calculated by the output color value calculation unit, and when the color difference is 0 (zero) or within a predetermined threshold value range, outputs color values after performing an addition or subtraction of a fixed value to/from one or plurality of the output color value of the vector object and the output color value of the raster object.

8. The image forming apparatus according to claim 1, wherein the overlap band representative color detection unit extracts and counts color values of all of the pixels within the overlap band and sets a color value whose count value is the largest as a representative color.

9. The image forming apparatus according to claim 1, wherein the overlap band representative color detection unit extracts and counts color values of pixels of an overlapping portion between the vector object and the raster object, and sets a color value whose count value is largest as a representative color.

* * * * *